United States Patent

[11] 3,599,553

[72] Inventors David E. Hansen
Fairport;
Arthur H. Crapsey, Rochester, both of, N.Y.
[21] Appl. No. 836,752
[22] Filed June 26, 1969
[45] Patented Aug. 17, 1971
[73] Assignee Eastman Kodak Company
Rochester, N.Y.

[54] SLIDABLE COVER AND HANDLE MEMBER FOR PHOTOGRAPHIC CAMERAS
3 Claims, 4 Drawing Figs.

[52] U.S. Cl. ........................................... 95/86,
95/11, 352/242, 352/243
[51] Int. Cl. ......................................... G03b 17/56
[50] Field of Search ............................. 95/86, 11;
352/242, 243; 16/115; 49/70

[56] References Cited
UNITED STATES PATENTS
1,987,041  1/1935  Wood ........................... 16/115 X
2,172,348  9/1939  Githens ........................ 95/86
2,495,223  1/1950  Bodlander ................... 95/11
3,109,687 11/1963  Dereng ........................ 16/115 X
3,240,143  3/1966  Koeber ......................... 352/243 X
3,380,366  4/1968  Olson ........................... 352/243 X
3,153,995 10/1964  Bretthauer et al. .......... 95/11
FOREIGN PATENTS
1,158,359 11/1963  Germany ...................... 95/86

Primary Examiner—John M. Horan
Assistant Examiner—T. A. Mauro
Attorneys—Robert W. Hampton and J. Addison Mathews ABSTRACT: A combined cover and handle member for a still or motion picture camera has a substantially rigid U-shaped configuration and is mounted on the camera casing for movement between an extended position and a retracted position. In the extended position the handle member serves as an aid for supporting the camera while taking pictures, and for carrying the camera between picture-taking operations. In the retracted position the handle member does not substantially increase the exterior dimensions of the camera and can be used as a cover for enclosing various camera mechanisms, such as the objective, light-sensitive cell, viewfinder, and trigger-operating member. Moreover, such camera mechanisms can be covered in the closed position of the handle member even though the mechanisms are located on more than a single side of the camera.

DAVID E. HANSEN
ARTHUR H. CRAPSEY
INVENTORS

DAVID E. HANSEN
ARTHUR H. CRAPSEY
INVENTORS

3,599,553

SLIDABLE COVER AND HANDLE MEMBER FOR PHOTOGRAPHIC CAMERAS

BACKGROUND OF THE INVENTION

The present invention relates to photographic cameras for taking still and motion pictures and more particularly to a handle member retractably mounted on such cameras.

It is well known in the photographic art to provide still and motion picture cameras with means for supporting the cameras while taking pictures or for carrying the cameras between picture-taking operations Previously known supporting or carrying means generally have been selected from one of three general types. The first type comprises a substantially rigid handle member securely and immovably connected to the camera casing. The second type of handle member also is substantially rigid, but is movably attached to the camera casing for movement between an open position wherein the handle member serves to support the camera while taking pictures and a closed position adjacent the camera body. This type of handle member is illustrated, for example, in U.S. Pats. No. 3,240,143 issued on Mar. 15, 1966 in the name of Koeber, Jr. et al.; and 3,380,366 issued on Apr. 30, 1968 in the name of Olson. The third type of handle member is disclosed, for example, in German Pat. No. 1,158,359, issued in the name of Agfa and published on Nov. 28, 1963. This type is flexible over its entire length and can be attached to the camera at its entire length and can be attached to the camera at its ends either rigidly or for relative sliding movement.

The aforementioned types of handle members for photographic cameras generally have been satisfactory for their intended purpose. However, each type suffers from certain disadvantages. For example, the first type always extends outwardly from the camera casing and therefore, substantially increases the overall exterior dimensions of the camera. While it is often possible to unfasten and separate the handle member from the camera, the handle still requires substantial storage room and, once detached from the camera, is likely to be lost. In the second type, the handle member can be moved to a retracted position for storage adjacent the case. However, this type of handle member must be thick in cross section to provide both a comfortable hand grip and a structure which is sufficiently rigid to prevent undesirable flexing. Therefore, even in its position against the camera casing, it will substantially increase the exterior dimensions of the camera. Further, the design and shape of such handle members ordinarily is not convenient for carrying the camera between picture-taking locations. The flexibility of the third type of handle member makes it somewhat cumbersome and difficult to use. When used as an aid to support the camera for taking pictures, the flexible member must be accurately positioned with the hand not then being used to hold the camera, and when the camera is inserted into a camera case between picture taking operations, the strap member must be carefully folded or otherwise positioned against the camera at the same folded or otherwise positioned against the camera at the same time the camera is being inserted into the case. Moreover, although the flexible member may be thin and flat in an open position, its multiple thicknesses in a folded position again increase the exterior dimensions of the camera.

It also is known in the photographic art to provide cameras with handle members which not only support the camera while taking pictures but also serve for other functions. For example, known movable handle members of the type disclosed in aforementioned U.S. Pat. No. 3,380,366, have also served to protect the camera objective and to prevent operation of the camera operating element when the handle member is in the closed or retracted position. However, while previously known handle members of this type also have been generally satisfactory, their straight configuration limits this covering function to only one side or end of the camera. Therefore, such previously known handle members cannot protect delicate camera features, for example, on two or even three different sides of the camera.

SUMMARY OF THE INVENTION

It is an object of the present invention to provide a substantially rigid U-shaped handle member which overcomes the above-noted disadvantages of previous handle members.

It is a further object of the present invention to provide a handle member movable between an extended position wherein it may be used either as an aid for supporting the camera while taking pictures or for carrying the camera between picture-taking operations, and a retracted position wherein the handle member does not substantially increase the exterior dimensions of the camera.

It is a further object of the present invention to provide a handle member of the above type which covers and protects delicate camera elements in the retracted position of the handle member.

It is still a further object of the present invention to provide a handle member of the above type which may cover and protect camera elements on more than one wall of the camera when the handle member is in its retracted position.

In accordance with the preferred embodiment of the invention a handle member of substantially rigid U-shaped configuration is mounted on the casing of a photographic camera for movement between an extended or open position and a retracted or closed position. In the open position the handle member serves as aid for supporting the camera while taking pictures and for carrying the camera between picture-taking operations. In the closed position the handle member lies adjacent the camera casing without substantially increasing the overall exterior dimensions of the camera. Moreover, in its closed position, the handle member substantially covers and protects three walls of the camera casing which may include on various ones of said walls the camera objective, light-sensitive cell, viewfinder, and camera-operating trigger. Additionally, the handle member is of such construction that it is inexpensive to manufacture and easy to operatively assemble onto the camera.

DETAILED DESCRIPTION OF THE PREFERRED EMBODIMENT

Figure 1:
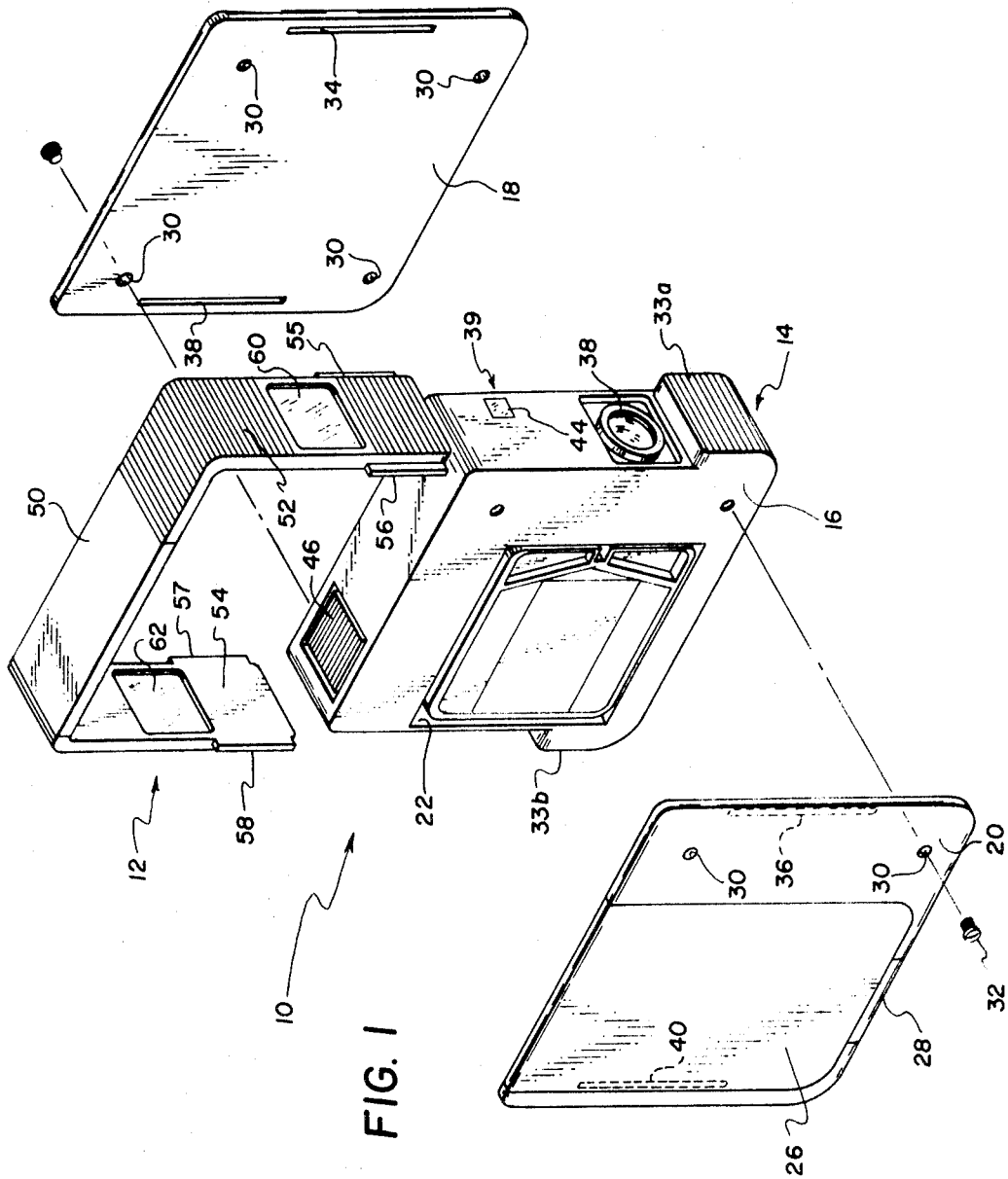
FIG. 1 is an exploded view of a camera including a handle member in accordance with the present invention.

Referring to FIG. 1, a preferred embodiment of the present invention is disclosed comprising a camera 10 having a substantially rigid U-shaped handle member 12.

The camera includes a casing 14 comprising a main body portion 16 and two side members or cover portions 18 and 20. One side member or cover portion, for example 18, includes a door 26 mounted at 28 for pivotal movement between an open position, uncovering a film compartment or recess 22, and a closed position wherein the compartment or recess is substantially light tight.

Side members 18 and 20 may be secured to the main body portion in any satisfactory manner to define the exterior surfaces of the camera. In the embodiment shown, however, this securing means includes means defining openings 30 in the side members and screw or other fasteners 32 insertable into the main body portion through openings 30 to securely fasten the side members to the body portion.

Adjacent the front and back edges, 33a and 33b respectively, of each of the side members 18 and 20, vertically oriented slots or recesses 34, 36, 38 and 40 are provided for receiving and permitting sliding movement of the handle member relative to the camera casing 14. This feature will be described more fully hereinafter in connection with the handle member.

The camera further include various well-known camera structures or mechanisms such as objective 38, viewfinder 39 (including eyepiece 42 and front window 44) and camera-operating element 46. These various camera structural elements can be located on any one or a plurality of sides or edges of the camera body and have been illustrated in the preferred embodiment on the front, rear and top walls of the casing.

Handle member 12 is formed of a plastic or metallic material having sufficient rigidity to maintain its U-shaped configuration. However, because of the inherent strength in a U-shaped configuration, this desired rigidity can be obtained even with material of thin cross section.

The handle member comprises a central portion 50 and first and second end portions 52 and 54 respectively oriented with the front and rear portions of the camera casing. The first or front and second or rear portions of the handle member further include tops or abutment surfaces 55, 56, 57 and 58 for respectively cooperating with the slots 34, 36, 38 and 40 in the cover member to slidably support the handle member on the camera casing and to define the limits of movement of the handle member relative to the casing. The handle member also may include first and second or front and rear windows 60 and 62 which are oriented for alignment with the viewfinder eyepiece and window when the handle member is in the open position.

During assembly, it should now be apparent that the substantially U-shaped handle member may simply be positioned adjacent and around the camera body portion 16 and thereafter the side covers 18 and 20 may be located over the handle member with abutment means 55, 56, 57 and 58 of the handle member located in slots 34, 36, 38 and 40 of the cover member. Once in this position, the threaded fastening members 32 may be inserted into openings 30 to securely fasten the handle member and cover members to the body portion.

Figure 2:
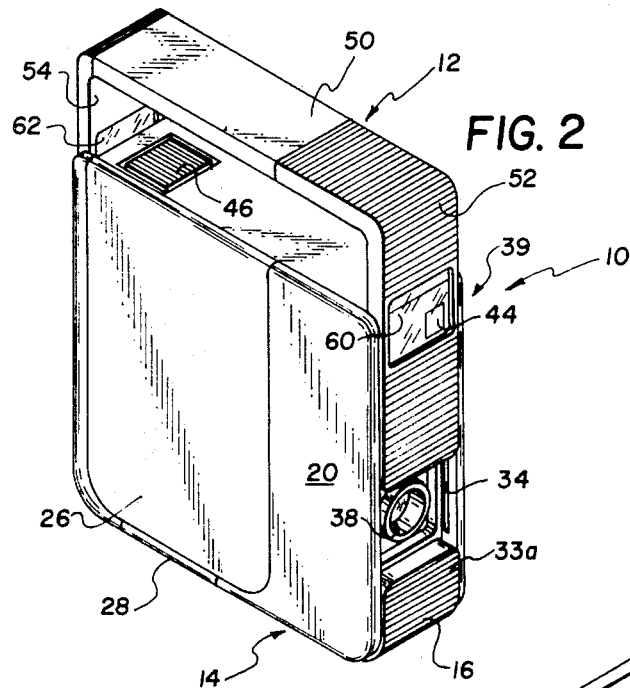
FIG. 2 is a perspective view of the camera and handle member of FIG. 1 illustrating the top, front and one side thereof with the handle member in an extended position.
Figure 3:
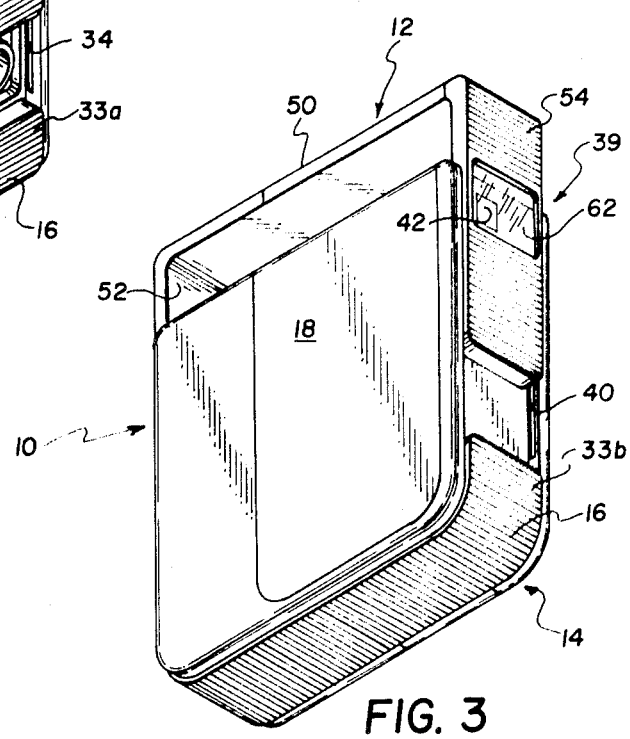
FIG. 3 is a perspective view of the camera and handle member of FIG. 1 illustrating the bottom, front, and one side thereof opposite from the side depicted in FIG. 2 and again illustrating the handle member in the extended position.
Figure 4:
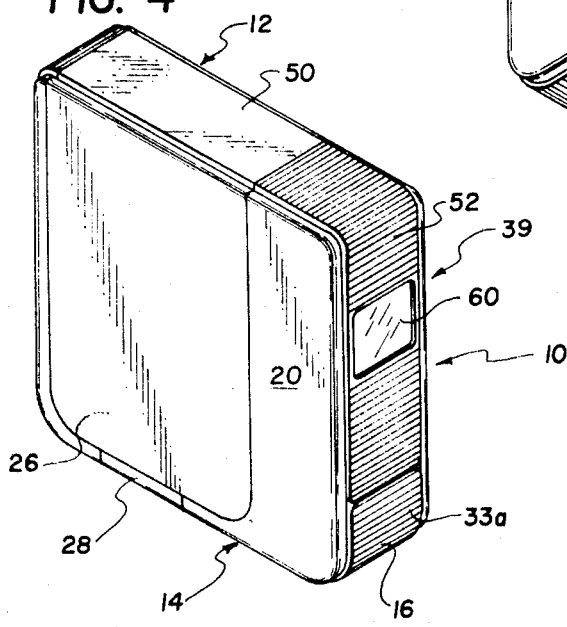
FIG. 4 is a perspective view of the camera and handle member of FIG. 1 corresponding substantially to FIG. 2 but depicting the handle in a closed position.

Referring now more particularly to FIGS. 2—4 it can be seen that, once the handle and camera are assembled, the handle member may be moved between the retracted or closed position shown in FIG. 4 and the extended or open position shown in FIGS. 2 and 3. The handle member is maintained in either of these respective positions by frictional engagement between the respective surfaces on the handle member and cooperating surfaces on the camera body and cover member.

The particular advantages of the present invention should now be apparent. For example, in the open or extended position of the handle member the camera can be grasped for operation with the fingers of one hand extending over the top of the camera and into a position for depression of camera-operating element 46. In this manner of holding the camera, the handle member overlies or abuts against the operator's fingers and can serve as an aid to maintain the camera stationary relative to the operator's hand. Between picture-taking operations, on the other hand, the open or extended handle member serves as a convenient means for carrying the camera.

In the closed position of the handle member it covers various exposed operating mechanisms of the camera including for example, the objective, viewfinder, light-sensitive cell and operating trigger. Its U-shaped configuration is particularly advantageous for this protective function since it may cover or enclose and protect not only elements on one side or edge wall of the camera but also on as many as two additional walls. Moreover, since the viewfinder and operating trigger are covered whenever the objective is covered, the camera cannot accidentally be operated prior to removal of the objective cover.

The invention has been described in detail with particular reference to a preferred embodiment thereof, but it will be understood that variations and modifications can be effected within the spirit and scope of the invention.

We Claim:
1. A camera comprising:
   a casing having first and second spaced ends, said first end having an opening for an objective and said second end having an opening for a viewfinder, said first and second ends being substantially parallel to each other;
   an open, substantially U-shaped handle member having first and second substantially parallel end portions joined by an elongate central portion; and
   means on said handle member and said casing for mounting said handle member on the casing for movement between (1) a retracted position wherein the first end portion of the handle member covers the opening in the casing for the objective and at least a substantial portion of the first end of the casing and the second portion of the handle member covers at least a substantial portion of the second end of the casing, and (2) an extended position wherein the first portion of the handle member uncovers the opening for the objective in the first end of the casing, the second portion of the handle member uncovers the opening for the viewfinder in the second end of the casing, and the central portion of the handle member is spaced from the portion of the casing between said first and second end of the casing, thereby to define a handle for holding the camera, said mounting means for said handle member comprising means for preventing movement of the central portion of the handle member away from casing when the handle member is in its extended position, thereby permitting the camera to be held by the handle.

2. A camera as set forth in claim 1 wherein said means for preventing movement of the central portion of the handle member comprises means defining a plurality of abutments on the first and second end portions of the handle member, and means on the casing defining elongate slots for receiving the abutments.

3. A camera as set forth in claim 1 wherein the camera has an operating trigger positioned on the casing so that the central portion of the handle member covers the trigger and prevents operation of the trigger when the handle member is in its retracted position and permits engagement with the trigger for operation of the camera only when the handle is in its extended position.